(12) United States Patent
Wu et al.

(10) Patent No.: US 11,032,024 B2
(45) Date of Patent: Jun. 8, 2021

(54) RADIO FRONTHAUL INTERFACE SIGNAL TRANSMISSION METHOD, NETWORK DEVICE, AND SYSTEM

(71) Applicant: HUAWEI TECHNOLOGIES CO., LTD., Guangdong (CN)

(72) Inventors: Qiuyou Wu, Dongguan (CN); Wei Su, Chengdu (CN); Qiwen Zhong, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 40 days.

(21) Appl. No.: 16/453,795

(22) Filed: Jun. 26, 2019

(65) Prior Publication Data

US 2019/0319742 A1 Oct. 17, 2019

Related U.S. Application Data

(63) Continuation of application No. PCT/CN2017/115254, filed on Dec. 8, 2017.

(30) Foreign Application Priority Data

Dec. 27, 2016 (CN) .......................... 201611225525.0

(51) Int. Cl.
*H04L 1/00* (2006.01)
*H04L 1/18* (2006.01)

(52) U.S. Cl.
CPC .......... *H04L 1/0057* (2013.01); *H04L 1/0008* (2013.01); *H04L 1/0013* (2013.01); *H04L 1/1812* (2013.01)

(58) Field of Classification Search
CPC ... H04L 1/0057; H04L 1/0008; H04L 1/0013; H04L 1/1812; H04L 1/00; H04L 25/49;
(Continued)

(56) References Cited

U.S. PATENT DOCUMENTS

2015/0071311 A1 3/2015 Caggioni et al.
2017/0005949 A1* 1/2017 Gareau ................. H04L 12/413
2017/0324657 A1 11/2017 Zhong

FOREIGN PATENT DOCUMENTS

CN 103502985 A 1/2014
CN 105871502 A 8/2016
WO 2016/202296 A1 12/2016

OTHER PUBLICATIONS

Naotaka Morita NTT Japan:"Optical Transport Networks and Technologies Standardization Work Plan (version 21)(for Agreement, Feb. 26, 2016);TD 504 (PLEN/15)", ITU-T Draft;Study Period 2013-2016, International Telecommunication Union, Geneva; CH, vol. 3/15, Feb. 24, 2016, pp. 1-61, XP044165686.

(Continued)

*Primary Examiner* — Thien Nguyen
(74) *Attorney, Agent, or Firm* — Womble Bond Dickinson (US) LLP

(57) ABSTRACT

This application provides a radio fronthaul interface signal transmission method, a device, and a system. A network device obtains a radio fronthaul interface signal including a plurality of code blocks. The network device maps the radio fronthaul interface signal to M flexible Ethernet FlexE service layer timeslots to generate a FlexE signal, where the FlexE service layer timeslots are determined based on a rate of the radio fronthaul interface signal, and M is a positive integer greater than or equal to 1. The network device sends the FlexE signal to one or more physical lanes. The radio fronthaul interface signal such as a CPRI signal, an eCPRI signal, or an NGFI signal is carried by using FlexE, and the FlexE service layer timeslots are divided based on the rate of the radio fronthaul interface signal.

20 Claims, 11 Drawing Sheets

(58) Field of Classification Search
CPC . H04L 1/0002; H04L 1/0015; H04L 25/4908; H04J 2203/0085; H04J 3/1658
See application file for complete search history.

(56) References Cited

OTHER PUBLICATIONS

Gomes Nathan J et al: "A flexible, ethernet fronthaul for 5th generation mobile and beyond", 2016 Optical Fiber Communications Conference and Exhibition (OFC), OSA, Mar. 20, 2016, p. 1, XP032942811.
Sebastien Gareau Ciena Canada: "CPRI over OTN start of new recommendation;C 1876", ITU-T Draft; Study Period 2013-2016, International Telecommunication Union, Geneva;CH, vol. 11 /15 Aug. 30, 2016, pp. 1-4, XP044181346.
"OTN Transport of CPRI signals; G.Sup56 (Feb. 2016)", ITU-T Standard, International Telecommunication Union, Geneva;CH, No. G.Sup56 (Feb. 2016) Feb. 26, 2016, pp. 1-24, XP044180016.
IA # OIF-FLEXE-01.0. Flex Ethernet Implementation Agreement, Mar. 2016, 31 pages.

\* cited by examiner

FIG. 4

| Synchronization control word | #Z.0.0 | Synchronization byte | 50h |
| --- | --- | --- | --- |
| | #Z.0.1 | Padding byte | 50h |
| | ... | | |
| | #Z.0.6 | | |
| | #Z.0.7 | Termination control character | /T/ |
| | #Z.0.8 | Start control character | /S/ |
| | #Z.0.9 | Padding byte | 50h |
| | ... | | |
| | #Z.0.15 | | |

FIG. 5

RADIO FRONTHAUL INTERFACE SIGNAL TRANSMISSION METHOD, NETWORK DEVICE, AND SYSTEM

CROSS-REFERENCE TO RELATED APPLICATIONS

This application is a continuation of International Application No. PCT/CN2017/115254, filed on Dec. 8, 2017, which claims priority to Chinese Patent Application No. 201611225525.0, filed on Dec. 27, 2016, the disclosures of the aforementioned applications are hereby incorporated by reference in their entireties.

TECHNICAL FIELD

The present disclosure relates to the communications field, and in particular, to a radio fronthaul interface signal transmission method, a device, and a system.

BACKGROUND

Currently, extending application scenarios of conventional Ethernet is discussed at the Optical Internetworking Forum (OIF), and a flexible Ethernet (FlexE) technology is proposed, to support functions such as a subrate, channelization, and inverse multiplexing for an Ethernet service.

Because Ethernet is widely used as a service interface in an access network and a metropolitan area network, FLexE based on an Ethernet technology has a function of service traffic convergence, and can implement a seamless connection to an Ethernet interface of an underlying service network. As the functions of a subrate, channelization, and inverse multiplexing in FlexE are introduced, application scenarios of Ethernet are greatly extended, flexibility of Ethernet applications is improved, and Ethernet technologies gradually develop towards the transport field.

In another aspect, as wireless communications technologies develop, deploying radio remote units (RRU) together becomes increasingly common. The RRUs are deployed away from a baseband control unit (BBU) together by using a network carrier already becomes a deployment solution of an operator. Currently, the BBU is connected to the RRU by using a radio fronthaul interface. In a conventional solution, the RRUs can be remotely deployed away from the BBU by using a technology such as wavelength division, a passive optical network (PON), and an optical transport network (OTN). However, in the prior art, a radio fronthaul interface signal cannot be carried by using FlexE. Therefore, how to carry a radio fronthaul interface signal by using FlexE and improve transmission efficiency becomes a problem that urgently should be resolved in the industry.

SUMMARY

In view of this, embodiments of the present disclosure provide a radio fronthaul interface signal transmission method, a device, and a system, to resolve a problem of carrying a radio fronthaul interface signal by using FlexE.

According to one embodiment of the present disclosure provides a method for sending a radio fronthaul interface signal, including: obtaining, by a network device, a radio fronthaul interface signal, where the radio fronthaul interface signal includes a plurality of code blocks; mapping the radio fronthaul interface signal to M flexible Ethernet FlexE service layer timeslots to generate a FlexE signal, where the FlexE service layer timeslots are determined based on a rate of the radio fronthaul interface signal, and M is a positive integer greater than or equal to 1; and sending the FlexE signal to one or more physical lanes.

In one embodiment of the present disclosure, the radio fronthaul interface signal such as a CPRI signal, an eCPRI signal, or an NGFI signal is carried by using FlexE, and the FlexE service layer timeslots are divided based on the rate of the radio fronthaul interface signal. Therefore, bandwidth usage of a fronthaul FlexE interface and transmission efficiency of the radio fronthaul interface signal are improved.

In one embodiment, a bandwidth of the FlexE service layer timeslot is greater than or equal to a lowest rate of the radio fronthaul interface signal. The bandwidth of the FlexE service layer timeslot is determined based on the lowest rate of the radio fronthaul interface signal, thereby improving FlexE carrying efficiency.

In one embodiment, the code block is a 64B/66B code block.

In one embodiment, the obtaining a radio fronthaul interface signal includes: obtaining the radio fronthaul interface signal using an 8B/10B encoding format, and performing encoding format conversion on the radio fronthaul interface signal using the 8B/10B encoding format, where the radio fronthaul interface signal on which encoding format conversion is performed includes a plurality of 64B/66B code blocks.

In one embodiment of the present disclosure, 64B/66B encoding is performed on the radio fronthaul interface signal such as a CPRI signal, and mapping processing of the FlexE service layer timeslot is performed by using a uniform encoding format, thereby simplifying a mapping processing process of the FlexE service layer timeslot.

In a possible implementation, a value of M includes any one of 1, 2, 4, 5, 8, 10, 16, 20, 24, and 48. The FlexE service layer timeslots are divided in a proper manner, so that radio fronthaul interface signals having different rate levels can be mapped to an integer quantity of FlexE service layer timeslots, thereby improving FlexE carrying efficiency.

In one embodiment, a bandwidth of the physical lane is 25 G or 50 G. This embodiment of the present disclosure may further reuse a PHY lane of 25 GE or 50 GE in an Ethernet technology, and can be compatible with an existing Ethernet network system.

In one embodiment, the method further includes: performing rate adaptation on the radio fronthaul interface signal, so that the rate of the radio fronthaul interface signal is adapted to a rate of the FlexE service layer timeslot.

In one embodiment of the present disclosure provides a radio fronthaul interface signal receiving method, including: receiving, by a network device, a flexible Ethernet FlexE signal through one or more physical lanes; demapping a radio fronthaul interface signal from M FlexE service layer timeslots of the FlexE signal, where the FlexE service layer timeslots are determined based on a rate of the radio fronthaul interface signal, and M is a positive integer greater than or equal to 1; and sending the radio fronthaul interface signal, where the radio fronthaul interface signal includes a plurality of code blocks.

In one embodiment of the present disclosure, the radio fronthaul interface signal such as a CPRI signal, an eCPRI signal, or an NGFI signal is carried by using FlexE, and the FlexE service layer timeslots are divided based on the rate of the radio fronthaul interface signal. Therefore, bandwidth usage of a fronthaul FlexE interface and transmission efficiency of the radio fronthaul interface signal are improved.

In a possible implementation, a bandwidth of the FlexE service layer timeslot is greater than or equal to a lowest rate of the radio fronthaul interface signal. The bandwidth of the FlexE service layer timeslot is determined based on the lowest rate of the radio fronthaul interface signal, thereby improving FlexE carrying efficiency.

In one embodiment, the code block is a 64B/66B code block.

In one embodiment, the sending the radio fronthaul interface signal includes: performing encoding format conversion on the radio fronthaul interface signal using a 64B/66B encoding format, and sending the radio fronthaul interface signal on which encoding format conversion is performed, where the radio fronthaul interface signal on which encoding format conversion is performed includes a plurality of 8B/10B code blocks.

In one embodiment of the present disclosure, 64B/66B encoding is performed on the radio fronthaul interface signal such as a CPRI signal, and mapping processing of the FlexE service layer timeslot is performed by using a uniform encoding format, thereby simplifying a mapping processing process of the FlexE service layer timeslot.

In one embodiment, a value of M includes any one of 1, 2, 4, 5, 8, 10, 16, 20, 24, and 48. The FlexE service layer timeslots are divided in a proper manner, so that radio fronthaul interface signals having different rate levels can be mapped to an integer quantity of FlexE service layer timeslots, thereby improving FlexE carrying efficiency.

In one embodiment, a bandwidth of the physical lane is 25 G or 50 G. This embodiment of the present disclosure may further reuse a PHY lane of 25 GE or 50 GE in an Ethernet technology, and can be compatible with an existing Ethernet network system.

According to one embodiment of the present disclosure provides a network device, including: an obtaining module, configured to obtain a radio fronthaul interface signal, where the radio fronthaul interface signal includes a plurality of code blocks; a mapping module, configured to map the radio fronthaul interface signal to M flexible Ethernet FlexE service layer timeslots to generate a FlexE signal, where the FlexE service layer timeslots are determined based on a rate of the radio fronthaul interface signal, and M is a positive integer greater than or equal to 1; and a sending module, configured to send the FlexE signal to one or more physical lanes.

In one embodiment of the present disclosure, the radio fronthaul interface signal such as a CPRI signal, an eCPRI signal, or an NGFI signal is carried by using FlexE, and the FlexE service layer timeslots are divided based on the rate of the radio fronthaul interface signal. Therefore, bandwidth usage of a fronthaul FlexE interface and transmission efficiency of the radio fronthaul interface signal are improved.

In one embodiment, a bandwidth of the FlexE service layer timeslot is greater than or equal to a lowest rate of the radio fronthaul interface signal. The bandwidth of the FlexE service layer timeslot is determined based on the lowest rate of the radio fronthaul interface signal, thereby improving FlexE carrying efficiency.

In one embodiment, the code block is a 64B/66B code block.

In one embodiment, the obtaining module is configured to: obtain the radio fronthaul interface signal using an 8B/10B encoding format, and perform encoding format conversion on the radio fronthaul interface signal using the 8B/10B encoding format, where the radio fronthaul interface signal on which encoding format conversion is performed includes a plurality of 64B/66B code blocks.

In one embodiment of the present disclosure, 64B/66B encoding is performed on the radio fronthaul interface signal such as a CPRI signal, and mapping processing of the FlexE service layer timeslot is performed by using a uniform encoding format, thereby simplifying a mapping processing process of the FlexE service layer timeslot.

In one embodiment, a value of M includes any one of 1, 2, 4, 5, 8, 10, 16, 20, 24, and 48. The FlexE service layer timeslots are divided in a proper manner, so that radio fronthaul interface signals having different rate levels can be mapped to an integer quantity of FlexE service layer timeslots, thereby improving FlexE carrying efficiency.

In one embodiment, a bandwidth of the physical lane is 25 G or 50 G. This embodiment of the present disclosure may further reuse a PHY lane of 25 GE or 50 GE in an Ethernet technology, and can be compatible with an existing Ethernet network system.

In one embodiment, the network device further includes: a rate adaptation module, configured to perform rate adaptation on the radio fronthaul interface signal, so that the rate of the radio fronthaul interface signal is adapted to a rate of the FlexE service layer timeslot.

According to one embodiment of the present disclosure provides a network device, including: a receiving module, configured to receive a flexible Ethernet FlexE signal through one or more physical lanes; a demapping module, configured to demap a radio fronthaul interface signal from M FlexE service layer timeslots of the FlexE signal, where the FlexE service layer timeslots are determined based on a rate of the radio fronthaul interface signal, and M is a positive integer greater than or equal to 1; and a sending module, configured to send the radio fronthaul interface signal, where the radio fronthaul interface signal includes a plurality of code blocks.

In one embodiment of the present disclosure, the radio fronthaul interface signal such as a CPRI signal, an eCPRI signal, or an NGFI signal is carried by using FlexE, and the FlexE service layer timeslots are divided based on the rate of the radio fronthaul interface signal. Therefore, bandwidth usage of a fronthaul FlexE interface and transmission efficiency of the radio fronthaul interface signal are improved.

In one embodiment, a bandwidth of the FlexE service layer timeslot is greater than or equal to a lowest rate of the radio fronthaul interface signal. The bandwidth of the FlexE service layer timeslot is determined based on the lowest rate of the radio fronthaul interface signal, thereby improving FlexE carrying efficiency.

In one embodiment, the code block is a 64B/66B code block.

In one embodiment, the sending module is configured to: perform encoding format conversion on the radio fronthaul interface signal using a 64B/66B encoding format, and send the radio fronthaul interface signal on which encoding format conversion is performed, where the radio fronthaul interface signal on which encoding format conversion is performed includes a plurality of 8B/10B code blocks.

In one embodiment of the present disclosure, 64B/66B encoding is performed on the radio fronthaul interface signal such as a CPRI signal, and mapping processing of the FlexE service layer timeslot is performed by using a uniform encoding format, thereby simplifying a mapping processing process of the FlexE service layer timeslot.

In one embodiment, a value of M includes any one of 1, 2, 4, 5, 8, 10, 16, 20, 24, and 48. The FlexE service layer timeslots are divided in a proper manner, so that radio fronthaul interface signals having different rate levels can be mapped to an integer quantity of FlexE service layer timeslots, thereby improving FlexE carrying efficiency.

In one embodiment, a bandwidth of the physical lane is 25 G or 50 G. This embodiment of the present disclosure may further reuse a PHY lane of 25 GE or 50 GE in an Ethernet technology, and can be compatible with an existing Ethernet network system.

According one embodiment of the present disclosure provides a network system, including the network device according to the third aspect or any possible implementation of the third aspect and the network device according to the fourth aspect or any possible implementation of the fourth aspect.

According to one embodiment of the present disclosure provides a network device, including: a processor, a memory, and at least one network interface. The memory is configured to store a computer-executable instruction. When the network device runs, the processor executes the computer-executable instruction stored in the memory, to enable the network device to perform the method according to the first aspect and any possible implementation of the first aspect.

According to one embodiment of the present disclosure provides a network device, including: a processor, a memory, and at least one network interface. The memory is configured to store a computer-executable instruction. When the network device runs, the processor executes the computer-executable instruction stored in the memory, to enable the network device to perform the method according to the second aspect and any possible implementation of the second aspect.

BRIEF DESCRIPTION OF DRAWINGS

The following briefly describes accompanying drawings used to describe the background and embodiments.

FIG. 4 is a schematic diagram of a 64B/66B encoding format according to an embodiment of the present invention;

FIG. 5 is a schematic diagram of a 64B/66B encoding format of a CPRI synchronization control word according to an embodiment of the present disclosure.

DESCRIPTION OF EMBODIMENTS

The following describes embodiments of the present disclosure with reference to the accompanying drawings.

Radio fronthaul interface signals may include a common public radio interface (CPRI) signal, an eCPRI signal (for example, including an Ethernet CPRI signal or an enhanced CPRI signal), a next-generation fronthaul interface (NGFI) signal, and the like. In the embodiments of the present disclosure, a radio fronthaul interface signal may be transmitted by using FlexE as a fronthaul network, or a radio fronthaul interface signal may be transmitted by using another type of bearer network, for example, a PON, an OTN, a wavelength division multiplexing (WDM) network, or Ethernet. In the embodiments of the present disclosure, an example in which FlexE carries a CPRI signal is used for description. A principle of carrying another type of radio fronthaul interface signal by using FlexE is similar.

Figure 1:
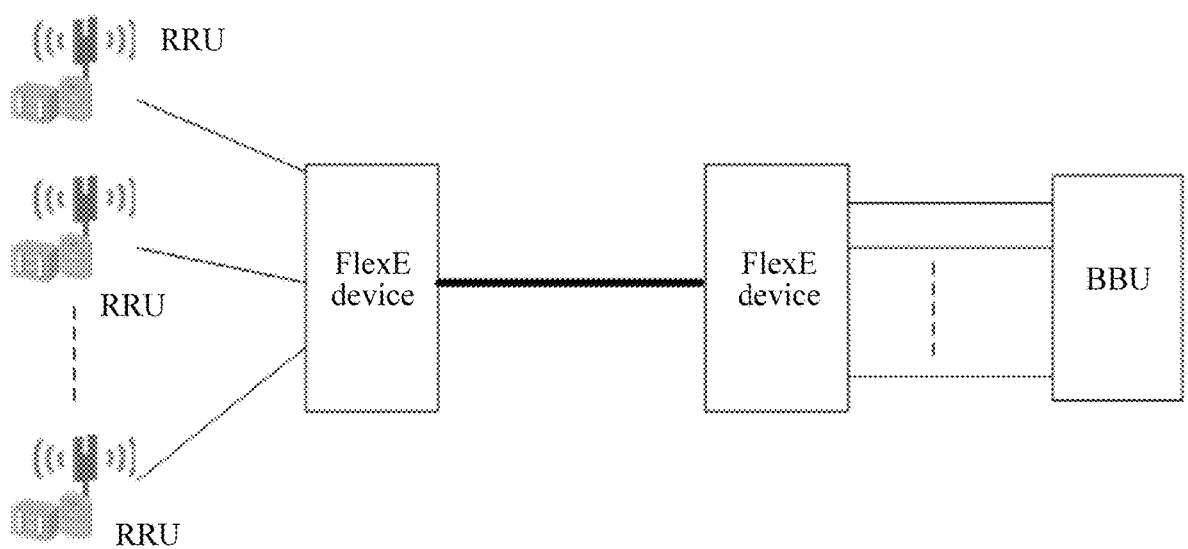
FIG. 1 is a schematic structural diagram of a network architecture according to an embodiment of the present disclosure.

FIG. 1 is a schematic structural diagram of a network architecture according to an embodiment of the present disclosure. As shown in FIG. 1, the network architecture includes wireless devices of a distributed base station: a BBU and an RRU, and further includes one or more FlexE devices. Two FlexE devices are shown in the figure. The one or more FlexE devices form a bearer network, and may be used to carry a CPRI signal. The BBU is connected to the RRU by using the one or more FlexE devices, and a CPRI signal transmitted between the BBU and the RRU may be carried by the one or more FlexE devices for transmission. For example, when the BBU is used as a transmit end, a CPRI signal sent by the BBU passes through the one or more FlexE devices and is then received by the RRU. Alternatively, when the RRU is used as a transmit end, a CPRI signal sent by the RRU passes through the one or more FlexE devices and is then received by the BBU.

Figure 2:
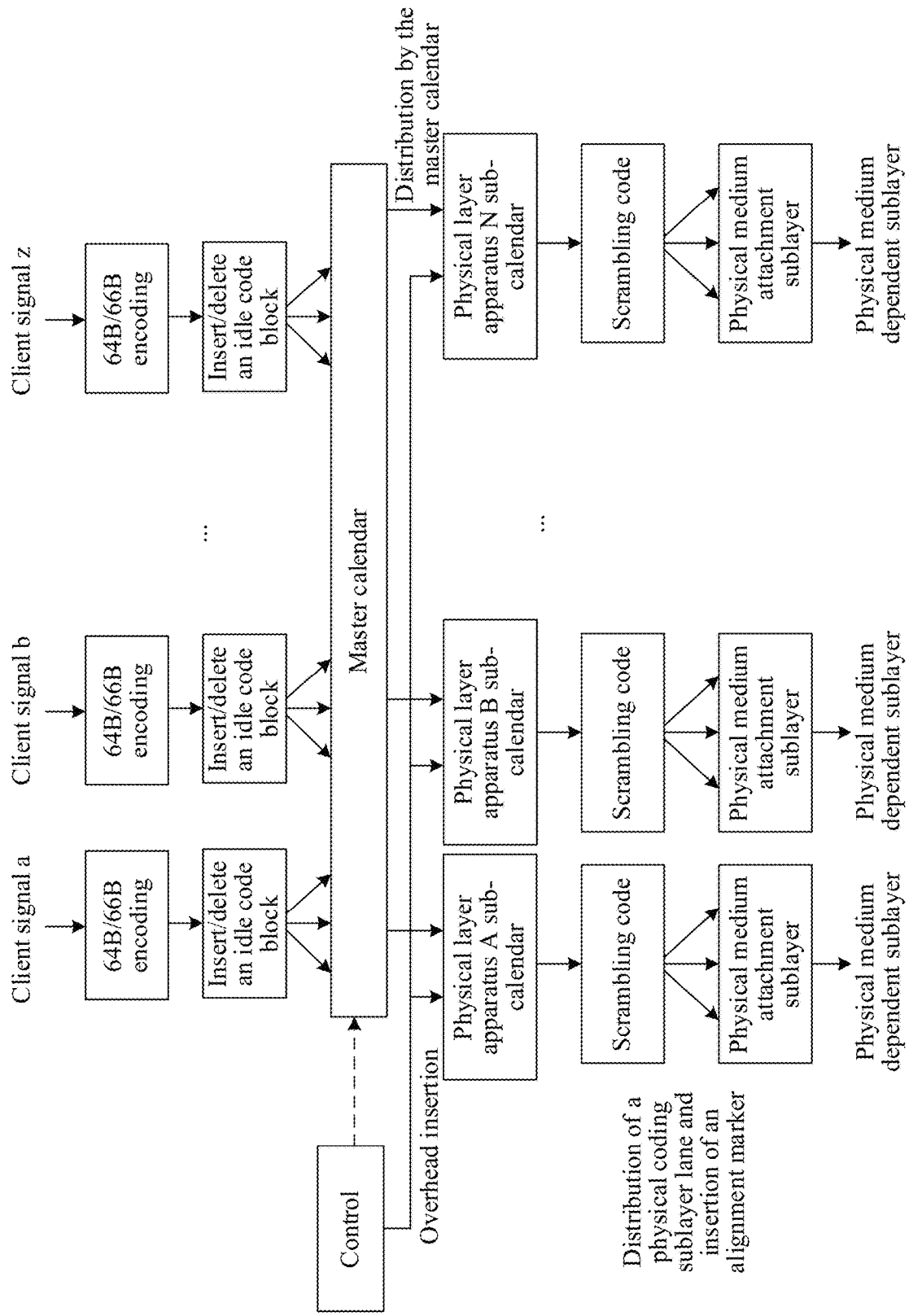
FIG. 2 is a schematic architectural diagram of a FlexE device according to an embodiment of the present disclosure.

An architecture of the FlexE device is briefly described first. FIG. 2 is a schematic architectural diagram of a FlexE device according to an embodiment of the present disclosure. An architecture of the FlexE device includes a FlexE client layer and a FlexE service layer. The FlexE client layer is mainly used to converge one or more client signals, for example, a client signal a, a client signal b, . . . , and a client signal z in FIG. 2. The client signal may come from an Ethernet interface of, for example, 10 G, 25 G, 40 G, or N*50 G. The FlexE service layer may be used to carry a FlexE client signal. The FlexE service layer may be implemented by using N physical layer device (PHY) lanes of 100 G, or may be implemented by using N PHY lanes of 25 G, N PHY lanes of 50 G, N PHY lanes of 200 G, N PHY lanes of 400 G, or the like.

A signal processing process of the FlexE device may include the following operations or actions: after receiving a plurality of client signals, for example, the client signal a, the client signal b, . . . , and the client signal z, performing, by the FlexE device, 64B/66B encoding on the received plurality of client signals, to form 66B code block flows, and performing rate adaptation on the code block flows of the client signals by inserting or deleting an idle (IDLE) code block; sending the code block flows of the client signals to a master calendar (Master Calendar or Calendar); after distribution by the master calendar, distributing the code block flows of the plurality of client signals to N PHY sub-calendars (sub-Calendar), and inserting a FlexE overhead to each PHY sub-calendar based on an interval period (for example, 20×1023×66B), to identify a FlexE frame structure, a sequence of each PHY, or the like; scrambling each PHY sub-calendar, dividing each PHY sub-calendar into a plurality of physical coding sublayer (PCS) lanes, and inserting an alignment marker (AM) to the plurality of physical coding sublayer lanes; and sending the plurality of physical coding sublayer lanes to which the alignment marked is inserted to a physical medium attachment (PMA) sublayer and further sending the plurality of physical coding sublayer lanes to which the alignment marker is inserted to a physical medium dependent (PMD) sublayer.

Currently, a basic rate defined for a CPRI interface is shown in Table 1, and CPRI signal types having 10 rate levels are included. At the current stage, high rate levels such as CPRI.5 and CPRI.6 are dominant, and there are few requirements for a low rate level such as CPRI.1. CPRI.1 is currently a lowest rate level of a CPRI signal. As a network bandwidth increases, CPRI application gradually transitions to a rate level such as 10 G or 25 G. In consideration of a current CPRI rate level, optionally, in this embodiment of the present disclosure, a FlexE network based on N PHY lanes of 25 G or N PHY lanes of 50 G may be constructed by using a PHY lane of 25 G or 50 G.

TABLE 1

| CPRI type | W (Bit) | Y (Byte) | A quantity of bytes of a basic frame | A quantity of bytes of a super frame | Encoding type | Line rate (Mbit/s) |
| --- | --- | --- | --- | --- | --- | --- |
| CPRI.1 | 16 | 1 | 16 | 4096 | 8 B/10 B | 614.4 |
| CPRI.2 | 16 | 2 | 32 | 8192 | 8 B/10 B | 1228.8 |
| CPRI.3 | 16 | 4 | 64 | 16384 | 8 B/10 B | 2457.6 |
| CPRI.4 | 16 | 5 | 80 | 20480 | 8 B/10 B | 3072.0 |
| CPRI.5 | 16 | 8 | 128 | 32768 | 8 B/10 B | 4915.2 |
| CPRI.6 | 16 | 10 | 160 | 40960 | 8 B/10 B | 6144.0 |
| CPRI.7 | 16 | 16 | 256 | 65536 | 8 B/10 B | 9830.4 |
| CPRI.8 | 16 | 20 | 320 | 81920 | 64 B/66 B | 10137.6 |
| CPRI.9 | 16 | 24 | 384 | 98304 | 64 B/66 B | 12165.12 |
| CPRI.10 | 16 | 48 | 768 | 196608 | 64 B/66 B | 24330.24 |

In this embodiment of the present disclosure, a FlexE interface of N*25 G is used as an example for description. A fronthaul FlexE interface of N*25 G includes N PHY lanes of 25 G, and may reuse a PHY lane of 25 GE (Gigabit Ethernet) in an Ethernet technology. In this embodiment of the present disclosure, N may be any positive integer.

Figure 3A:
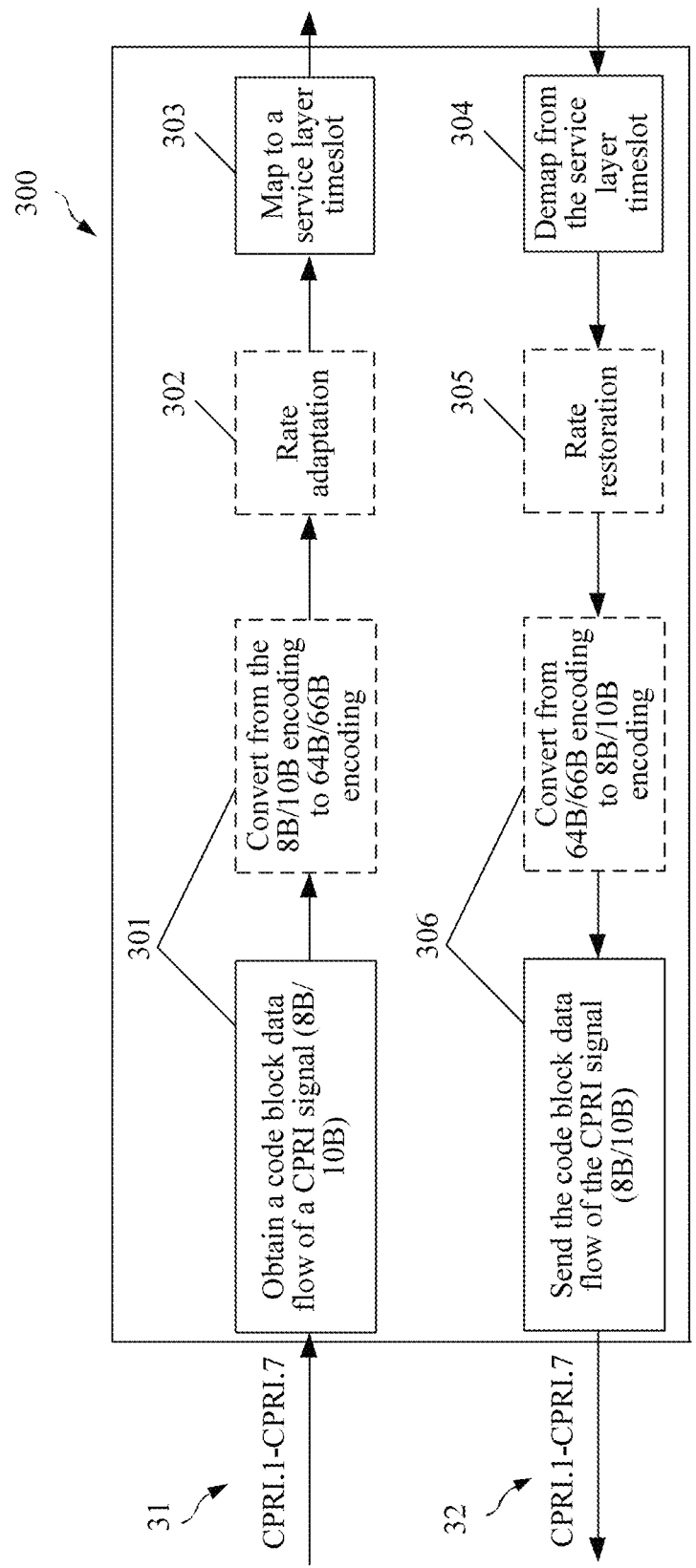
FIG. 3a is a schematic structural diagram of an apparatus for processing signals of CPRI.1 to CPRI.7 according to an embodiment of the present disclosure.

FIG. 3a is a schematic structural diagram of an apparatus for processing signals of CPRI.1 to CPRI.7 according to an embodiment of the present disclosure. Actions or operations corresponding to dashed-line boxes in the figure are optional operations or actions. As shown in FIG. 3a, the apparatus 300 for processing the signals of CPRI.1 to CPRI.7 includes a sending side 31 and a receiving side 32. The sending side 31 and the receiving side 32 may be located in a same FlexE device or may be located in different FlexE devices. For example, the FlexE device in FIG. 1 may include only a sending side or a receiving side, or may include both a receiving side and a sending side.

As shown in FIG. 3a, a processing process on the sending side 31 may include the following operations, actions, blocks etc. 301: Obtain any one or more of CPRI signals of CPRI.1, CPRI.2, . . . , and CPRI.7. The CPRI signal may be received from a BBU or an RRU. 8B/10B encoding is used as an encoding format of the CPRI signal. Optionally, the CPRI signal is converted from 8B/10B encoding to 64B/66B encoding. 302: Optionally, perform rate adaptation on the encoded CPRI signals. 303: Map the CPRI signals to a FlexE service layer timeslot to generate a FlexE signal, and send the FlexE signal to one or more physical lanes. Optionally, the physical lanes are one or more sub-calendars, or one or more PHY lanes, or one or more PHY sub-calendars. A processing process on the receiving side 32 may include the following operations, actions, blocks etc. 304: Receive the FlexE signal from the physical lanes, and demap the CPRI signals from the FlexE service layer timeslot of the FlexE signal. Optionally, the physical lanes are one or more sub-calendars, or one or more PHY lanes, or one or more PHY sub-calendars. 305: Optionally, perform rate restoration on the CPRI signals. If rate adaptation is performed on the CPRI signals on the sending side, rate restoration may be performed on the CPRI signals, that is, rates of the CPRI signals are restored to rates that exist before rate adaptation. 306: Optionally, if the CPRI signals are converted from 8B/10B encoding to 64B/66B encoding on the sending side, the CPRI signals may be converted from 64B/66B encoding to 8B/10B encoding. A code block data flow of the CPRI signals is sent, for example, may be sent to the RRU or the BBU.

Figure 3B:
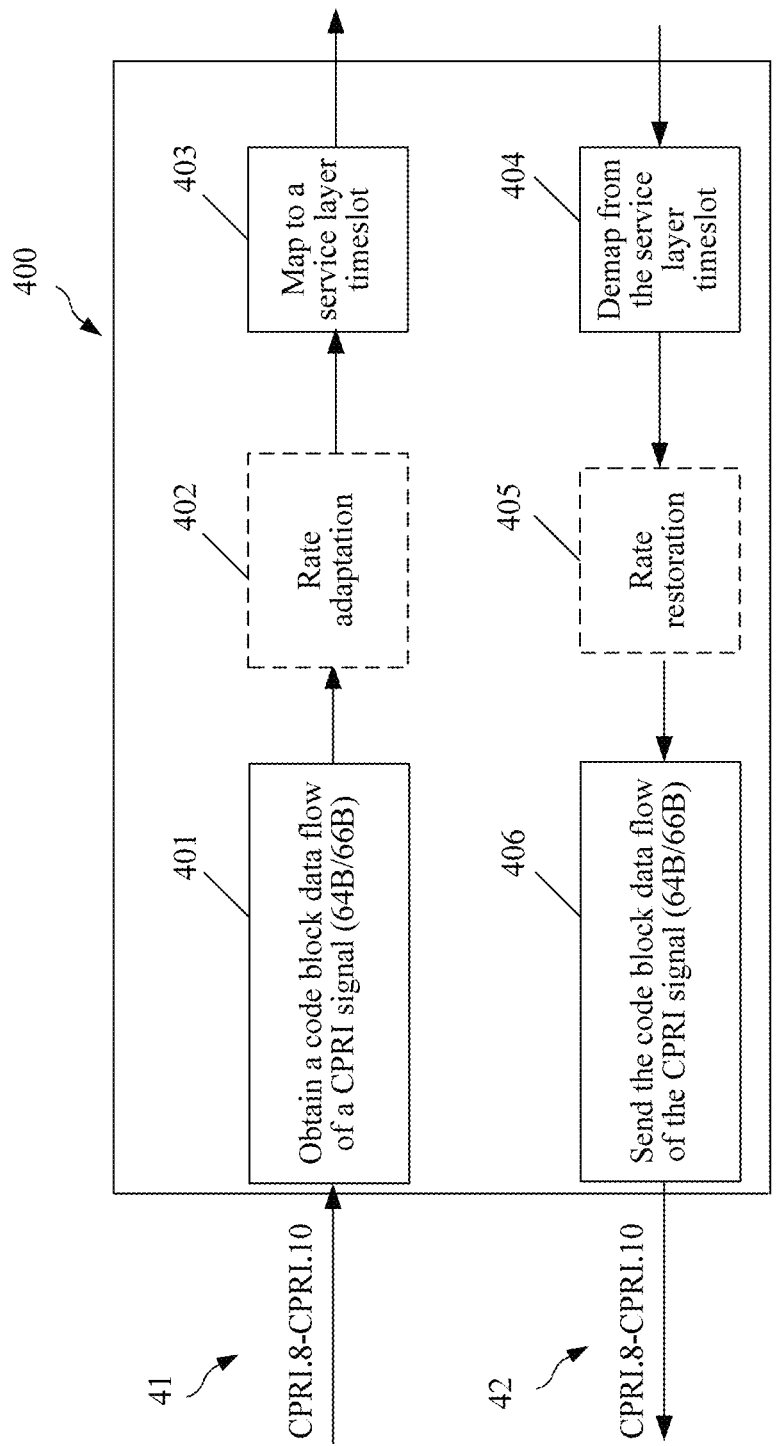
FIG. 3b is a schematic structural diagram of an apparatus for processing signals of CPRI.8 to CPRI.10 according to an embodiment of the present disclosure.

FIG. 3b is a schematic structural diagram of an apparatus for processing signals of CPRI.8 to CPRI.10 according to an embodiment of the present disclosure. Actions or operations corresponding to dashed-line boxes in the figure are optional actions or operations. As shown in FIG. 3b, the apparatus 400 for processing the signals of CPRI.8 to CPRI.10 includes a sending side 41 and a receiving side 42. The sending side 41 and the receiving side 42 may be located in a same FlexE device or may be located in different FlexE devices. A difference between FIG. 3a and FIG. 3b is as follows: 8B/10B encoding is used for CPRI signals having the seven rate levels of CPRI.1, CPRI.2, . . . , and CPRI.7 in FIG. 3a, and 64B/66B encoding is used for CPRI signals having the three rate levels of CPRI.8, CPRI.9, and CPRI.10 in FIG. 3b. Optionally, in 301 shown in FIG. 3a, to keep consistent with a 64B/66B encoding format of CPRI.8 to CPRI.10, any one or more of CPRI signals of CPRI.1 to CPRI.7 may be converted to 64B/66B encoding. However, because the 64B/66B encoding format is used for CPRI.8 to CPRI.10 in FIG. 3b, encoding format conversion may not need to be performed in 401 and 406 in FIG. 3b. Optionally, CPRI.8 to CPRI.10 may be further converted to 8B/10B encoding, and 8B/10B encoding is used for CPRI.1 to CPRI.7. Optionally, encoding format conversion may alternatively not be performed on the CPRI signal. To be specific, 8B/10B encoding is used for CPRI.1 to CPRI.7, and the 64B/66B encoding format is used for CPRI.8 to CPRI.10. For a processing process of 402 to 405 in FIG. 3b, refer to the processing process of 302 to 305 in FIG. 3a.

In this embodiment of the present disclosure, an example in which CPRI.1 to CPRI.7 are converted to 64B/66B encoding, and 64B/66B encoding is used for CPRI.8 to CPRI.10 is used for description. After CPRI.1 to CPRI.7 are converted to 64B/66B encoding, a line rate changes. Table 2 is a line rate table of CPRI.1 to CPRI.7 on which encoding format conversion is performed. In Table 2, when encoding format conversion is performed on CPRI.1 to CPRI.7, a line rate changes. Encoding format conversion is not performed on CPRI.8 to CPRI.10, and the line rates do not change and the line rates in Table 1 are still used.

TABLE 2

| CPRI type | Line rate (Mbit/s) before encoding conversion | Line rate (Mbit/s) after encoding conversion |
| --- | --- | --- |
| CPRI.1 | 614.4 (8B/10B) | 506.880 (64B/66B) |
| CPRI.2 | 1228.8 (8B/10B) | 1013.760 (64B/66B) |
| CPRI.3 | 2457.6 (8B/10B) | 2027.520 (64B/66B) |
| CPRI.4 | 3072.0 (8B/10B) | 2534.400 (64B/66B) |
| CPRI.5 | 4915.2 (8B/10B) | 4055.040 (64B/66B) |
| CPRI.6 | 6144.0 (8B/10B) | 5068.800 (64B/66B) |
| CPRI.7 | 9830.4 (8B/10B) | 8110.080 (64B/66B) |
| CPRI.8 | 10137.6 (8B/10B) | (not involved) |
| CPRI.9 | 12165.12 (8B/10B) | (not involved) |
| CPRI.10 | 24330.24 (8B/10B) | (not involved) |

Figure 4:
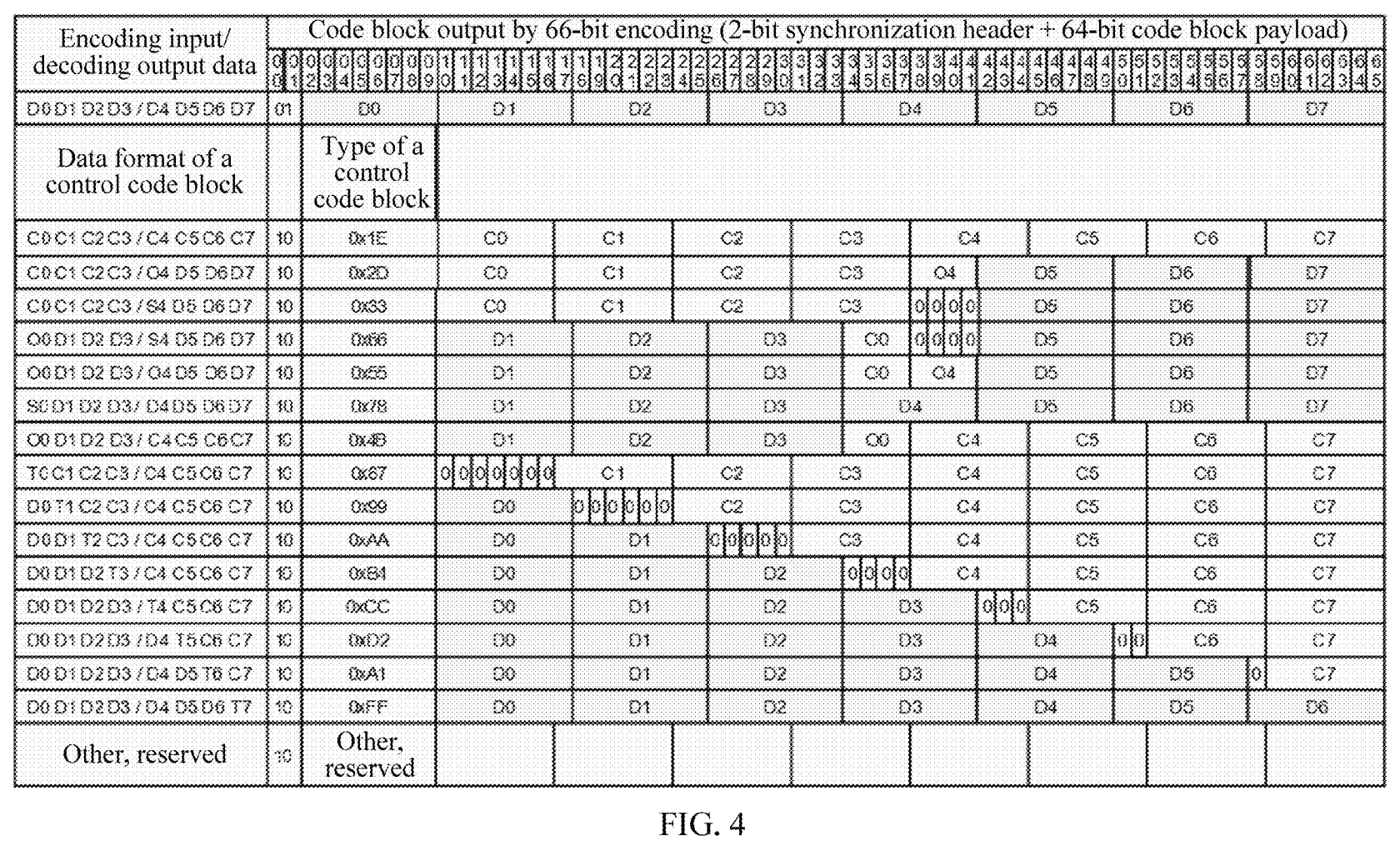

The 64B/66B encoding format is used for CPRI.1 to CPRI.7 to be effectively compatible with the encoding format of CPRI.8 to CPRI.10 and compatible with a PHY lane of 25 GE. FIG. 4 is a schematic diagram of a 64B/66B encoding format according to an embodiment of the present disclosure. The 64B/66B encoding format may include a data code block (D0D1D2D3/D4D5D6D7) whose synchronization header is 01 and a control code block whose synchronization header is 10. For the 64B/66B encoding format, further refer to an encoding format defined in IEEE 802.3.

The following details a processing process on a sending side.

A CPRI signal may be sent from a BBU to an RRU through one or more FlexE devices, or may be sent from an RRU to a BBU through one or more FlexE devices. A CPRI signal may be received on a sending side from the BBU or the RRU. Optionally, when a CPRI signal should be converted from 8B/10B encoding to 64B/66B encoding, a frame header (or referred to as a synchronization byte) K28.5 of a CPRI super frame based on 8B/10B encoding should be indicated again. FIG. 5 is a schematic diagram of a 64B/66B encoding format of a CPRI synchronization control word according to an embodiment of the present disclosure. For example, a synchronization byte 50h of 64B/66B encoding may be used for indication. Optionally, another preset control word combination in 64B/66B encoding may be alternatively used for indication.

Because there is a rate difference between the CPRI signal and a bandwidth of the timeslot to which the CPRI signal is mapped, optionally, 302 (or 402) may be performed before 303 (or 403), so that rate adaptation or rate compensation may be performed on the CPRI signal, to match the rate of the FlexE service layer timeslot. For example, a rate adaptation or compensation manner such as adding or deleting an idle (IDLE) code block may be used. To be specific, an idle code block is inserted to or deleted from a code block data flow of the CPRI signal. Optionally, rate adaptation may be alternatively performed by using a solution of generic mapping procedure (GMP). For example, the code block data flow of the CPRI signal includes a valid 66B code block used to carry the CPRI signal and an invalid 66B code block (for example, an idle code block) used for rate adaptation. A quantity of valid 66B code blocks included in a particular quantity of 66B code blocks is calculated (for example, 10 66B code blocks include eight valid 66B code blocks), and information about the quantity of valid 66B code blocks is inserted to a FlexE overhead and is transmitted to a receive end. The valid 66B code blocks are restored at the receive end based on the quantity of valid 66B code blocks and a particular algorithm, to remove the invalid 66B code blocks. In the solution of GMP, the quantity of invalid 66B code blocks may be further inserted to the FlexE overhead, so that the valid 66B code blocks are restored on the receiving side by using the quantity of invalid 66B code blocks.

In 303 or 403, the code block data flow of the CPRI signal is mapped to the one or more FlexE service layer timeslots, to generate the FlexE signal. The FlexE signal is information transmitted in the FlexE service layer timeslots. A FlexE service layer may be constructed by using a time division multiplexing (TDM) framing technology based on Ethernet encoding. For example, the FlexE service layer may include a master calendar that may be referred to as a calendar. The master calendar includes 50×N 66B code blocks. To be specific, the master calendar has 50×N service layer timeslots (Calendar Slot) using a 66B code block as a unit. The service layer timeslot may be referred to as a master calendar timeslot. In this example, N PHY lanes of 25 G form a FlexE interface, and each PHY lane may be divided into 50 timeslots. A bandwidth of the FlexE interface is N*25 G, and a bandwidth of each timeslot may be calculated by using the following formula:

25 G×66/64×(1023×50/(1023×50+1))/50.

A bandwidth of each timeslot calculated based on the foregoing formula is approximately 515.615 Mbit/s. A quantity of FlexE service layer timeslots that the CPRI signal should occupy may be calculated by using the bandwidth of the timeslot. As shown in Table 3, Table 3 is a table of a timeslot quantity of the CPRI signal at each rate level that is calculated by using the bandwidth of 515.615 Mbit/s of the timeslot.

TABLE 3

| CPRI type | Encoding type | Line rate (Mbit/s) after encoding conversion | Required timeslot quantity |
| --- | --- | --- | --- |
| CPRI.1 | 64B/66B (after encoding conversion) | 506.880 | 1 |
| CPRI.2 | 64B/66B (after encoding conversion) | 1013.760 | 2 |
| CPRI.3 | 64B/66B (after encoding conversion) | 2027.520 | 4 |
| CPRI.4 | 64B/66B (after encoding conversion) | 2534.400 | 5 |
| CPRI.5 | 64B/66B (after encoding conversion) | 4055.040 | 8 |
| CPRI.6 | 64B/66B (after encoding conversion) | 5068.800 | 10 |
| CPRI.7 | 64B/66B (after encoding conversion) | 8110.080 | 16 |
| CPRI.8 | 64B/66B | 10137.6 | 20 |
| CPRI.9 | 64B/66B | 12165.12 | 24 |
| CPRI.10 | 64B/66B | 24330.24 | 48 |

The bandwidth of the FlexE service layer timeslot may be determined based on the rate of the radio fronthaul interface signal. For example, in this example, the bandwidth of the FlexE timeslot is 515.615 Mbit/s, and is exactly slightly greater than the line rate of 506.880 Mbit/s after encoding conversion of CPRI.1 at the lowest rate level. CPRI signals at other rate levels can be exactly adapted to an integer quantity of FlexE service layer timeslots. For example, quantities of FlexE service layer timeslots occupied by CPRI.2 to CPRI.10 are respectively 2, 4, 5, 8, 10, 16, 20, 24, and 48. Optionally, the bandwidth of the FlexE service layer timeslot may be alternatively equal to a line rate after encoding conversion or before encoding conversion of CPRI.1. The bandwidth of the FlexE service layer timeslot may be alternatively an integer multiple of a line rate after encoding conversion of CPRI.1, or may be an integer multiple of a line rate before encoding conversion of CPRI.1. Alternatively, the bandwidth of the FlexE service layer timeslot may be determined based on a rate of any CPRI signal of CPRI.2 to CPRI.10, or may be determined based on a rate of another type of radio fronthaul interface signal, for example, an eCPRI signal or an NGFI signal.

Transmission efficiency of the radio fronthaul interface signal such as the CPRI signal can be improved by dividing the FlexE service layer timeslots.

When a code block data flow of a CPRI signal is mapped to a particular quantity of FlexE service layer timeslots, a bandwidth of a timeslot occupied by the CPRI signal may be greater than or equal to a line rate of the CPRI signal. For example, the line rate of CPRI.1 is 506.880 Mbit/s after conversion to 64B/66B encoding, and a bandwidth of one FlexE service layer timeslot occupied by CPRI.1 is 515.615 Mbit/s and is slightly greater than the line rate after encoding conversion of CPRI.1.

Figure 6:
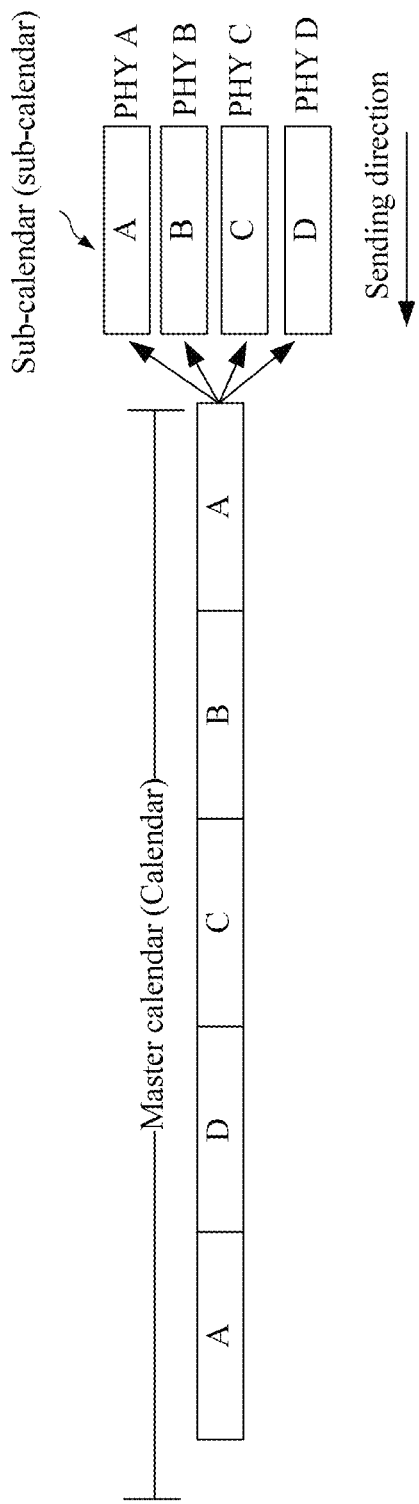
FIG. 6 is a schematic diagram of timeslot distribution according to an embodiment of the present disclosure.

The FlexE signal is sent to one or more physical lanes. For example, a FlexE service layer timeslot carrying the CPRI signal is distributed to a plurality of (N) PHY sub-calendars (which may also be referred to as sub-calendars, PHY lane) by polling. FIG. 6 is a schematic diagram of timeslot distribution according to an embodiment of the present disclosure. As shown in FIG. 6, a master calendar includes several groups of timeslots. Four groups of A, B, C, and D are shown in the figure, and a corresponding quantity N of PHY sub-calendars is 4. Each group of timeslots may include 50 timeslots: a slot 0 to a slot 49. A transmission unit of a timeslot may be a 66B code block. To be specific, data flows formed by several consecutive 66B code blocks may be sent in a timeslot, and are continuously sent in a direction to which an arrow points in the figure. In this example, the PHY sub-calendars may have a bandwidth of 25 G, and include a PHY A to a PHY D.

Figure 7:
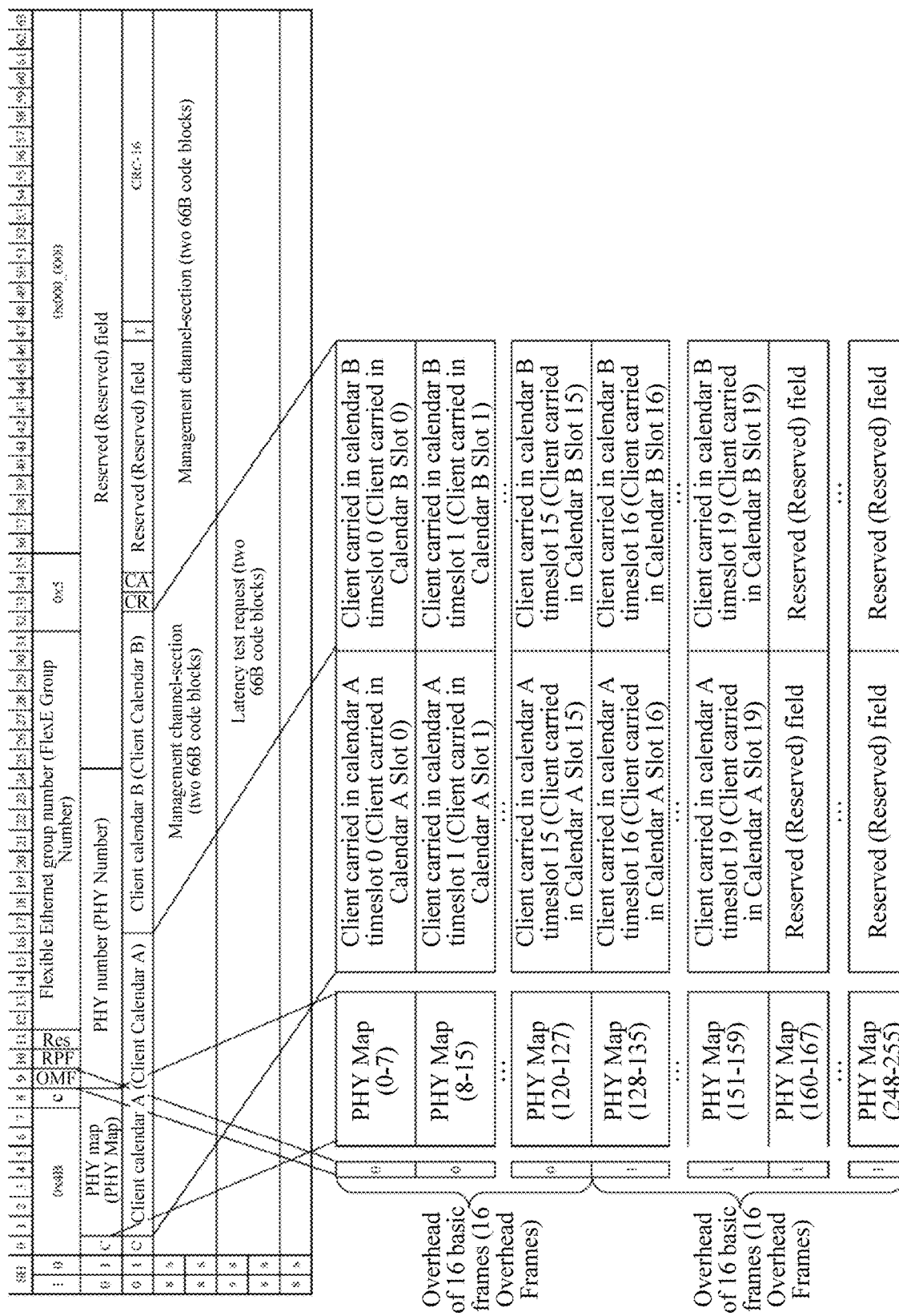
FIG. 7 is a schematic diagram of an overhead format according to an embodiment of the present disclosure.

Optionally, before a CPRI signal is distributed to the plurality of PHY sub-calendars, a FlexE overhead may be further added to a data flow of each PHY sub-calendar, to generate a FlexE frame. The FlexE frame is a transmission format of a FlexE signal. That is, the FlexE signal may further include the FlexE overhead. The FlexE overhead may be a 66B control code block. FIG. 7 is a schematic diagram of an overhead format according to an embodiment of the present disclosure. As shown in FIG. 7, the FlexE overhead may include eight 66B code blocks. The FlexE overhead may be used to identify a FlexE frame structure. For example, 0x4B and 0x05 of a first code block are used to identify a FlexE frame structure. The FlexE overhead may further identify a sequence of each PHY sub-calendar, for example, identify a sequence of each PHY sub-calendar by using a PHY map (PHY Map) of a second code block. The FlexE overhead may identify a correspondence between a currently-carried CPRI signal and a FlexE timeslot, for example, identify the correspondence by using a client calendar A/B (Client Calendar A/B) of a third code block. Optionally, the FlexE overhead may further identify a signal type (CPRI, eCPRI, NGFI, or the like) of the radio fronthaul interface signal, for example, may identify the signal type by using a reserved (Reserved) field. Specifically, the FlexE overhead may be inserted to each PHY sub-calendar based on a particular frequency or period.

Figure 8:
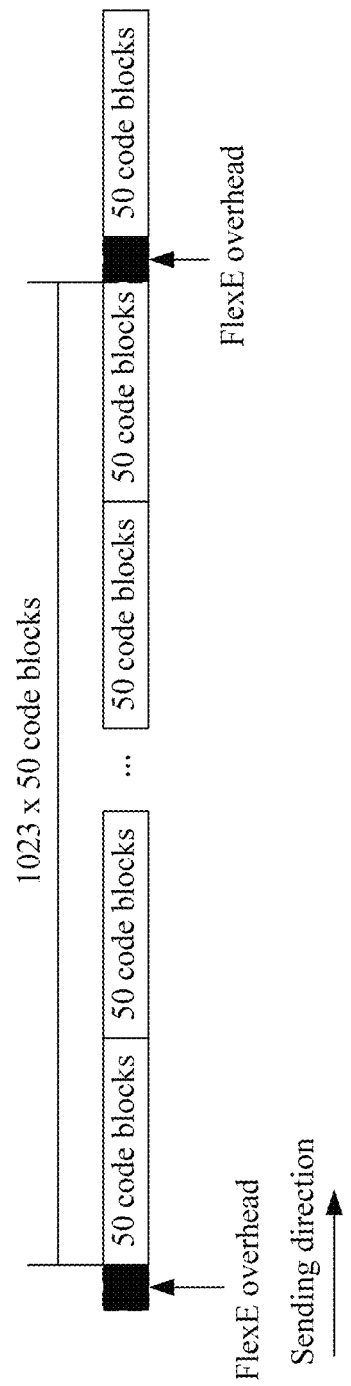
FIG. 8 is a schematic diagram of a FlexE overhead insertion method according to an embodiment of the present disclosure.

FIG. 8 is a schematic diagram of a FlexE overhead insertion method according to an embodiment of the present disclosure. A black square box in the figure indicates a FlexE overhead. For example, the FlexE overhead may be inserted to a PHY sub-calendar based on a particular period interval, for example, 1023×50 66B code blocks are used as a period. Certainly, another period interval may be alternatively used, and this is not limited in the present disclosure. A FlexE interface of N*25 G is used, a PHY sub-calendar may not be divided, an AM is not added for alignment either, and a CPRI signal carried on a PHY sub-calendar is directly sent by using a PHY of 25 G.

The following describes a processing process on a receiving side in detail.

A FlexE signal is received, where the FlexE signal may include signals of one or more PHY sub-calendars. A receiving side and a sending side may be located on different FlexE devices, and the FlexE signal may be received on the receiving side from the FlexE device on which the sending side is located. For example, the FlexE signal includes N PHY sub-calendars of 25 G, and a signal of each PHY sub-calendar may be obtained.

A signal of each PHY lane is sent in the FlexE service layer timeslot, and a CPRI signal is demapped from the service layer timeslot of the FlexE signal. For example, a FlexE overhead of each PHY sub-calendar is identified. Information obtained by identifying the FlexE overhead may include a FlexE frame structure, a sequence of each PHY sub-calendar, a correspondence between a currently-carried CPRI signal and a FlexE timeslot, a signal type of CPRI, and the like. Each PHY sub-calendar may be sorted and a sequence of a PHY sub-calendar is restored based on the sequence of each PHY sub-calendar of the FlexE overhead. The FlexE service layer timeslot may include the master calendar describe above, and details are not described herein again.

Optionally, if rate adaptation is performed on a CPRI signal on the sending side, rate restoration may be performed on the CPRI signal on the receiving side. For example, rate restoration may be performed by adding or deleting an idle code block, GMP, or the like.

If encoding conversion is performed on a CPRI signal on the sending side, for example, a CPRI signal at any one or more rate levels of CPRI.1 to CPRI.7 is converted from 8B/10B encoding to 64B/66B encoding, the CPRI signal may be converted from 64B/66B encoding to 8B/10B encoding on the receiving side. If encoding conversion is not performed on a CPRI signal on the sending side, for example, a CPRI signal at any one or more rate levels of CPRI.8 to CPRI.10 uses a 64B/66B encoding format, a 64B/66B code block data flow of the CPRI signal is directly sent. For example, the 64B/66B code block data flow of the CPRI signal may be sent to an RRU or a BBU.

Optionally, in this embodiment of the present disclosure, a fronthaul FlexE interface of N*50 G may be further constructed by using a PHY lane of N*50 GE or a PHY lane of N*50 G. For definition of a PHY rate and 64B/66B encoding in this embodiment, refer to a standard of a PHY lane of 50 GE stipulated by IEEE. For a sending and receiving processing process of a CPRI signal on an FlexE interface of N*50 G, refer to a sending and receiving processing process of a CPRI signal on a FlexE interface of N*25 G. Optionally, on the FlexE interface of N*50 G, a master calendar on a FlexE service layer may include 100×N timeslots using a 66B code block as a unit. N PHY lanes of 50 G form a FlexE interface, and each PHY lane may be divided into 100 timeslots. A bandwidth of each timeslot is approximately 500 Mbit/s. The consecutive 100×N FlexE service layer timeslots of 66B code blocks are distributed to N PHY sub-calendars by polling. Each PHY sub-calendar has a structure of 100 consecutive 66B code blocks, and a transmission unit of each timeslot may be a 66B code block. Optionally, similar to a FlexE interface of N*25 G, a FlexE overhead may be added to a data flow of each PHY sub-calendar.

In the foregoing embodiments, sending or receiving of a CPRI service (that is, a service transmitted in a form of a CPRI signal) by using a FlexE interface is mainly described. In addition to transmission of a CPRI service, an Ethernet service may also be transmitted on the FlexE interface. For example, both the CPRI service and the Ethernet service may be concurrently transmitted on one FlexE interface. On a FlexE interface, the Ethernet service may be carried by using all FlexE service layer timeslots, or the CPRI service may be carried by using all FlexE service layer timeslots, or the Ethernet service may be carried by using some FlexE service layer timeslots and the CPRI service may be carried by using some FlexE service layer timeslots. The Ethernet service may be a service of 1 GE, 10 GE, 25 GE, or the like. For example, when the Ethernet service is mapped to a service layer timeslot of a FlexE interface of N*25 G or N*50 G, if a bandwidth of each service layer timeslot is 515.615 Mbit/s, Ethernet services of 1 GE, 10 GE, and 25 GE respectively should occupy 2, 20, and 50 timeslots. Optionally, when the Ethernet service is mapped to a FlexE service layer timeslot, rate adaptation may be performed by idle adding or deleting.

In this embodiment of the present disclosure, the radio fronthaul interface signal such as a CPRI signal, an eCPRI signal, or an NGFI signal is carried by using FlexE, and the FlexE service layer timeslots are divided based on the rate of the radio fronthaul interface signal. Therefore, bandwidth usage of a fronthaul FlexE interface and transmission efficiency of the radio fronthaul interface signal are improved.

Figure 9:
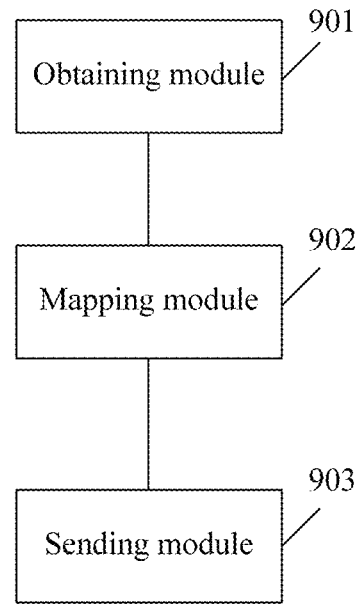
FIG. 9 is a schematic structural diagram of a network device according to an embodiment of the present disclosure.

FIG. 9 is a schematic structural diagram of a network device according to an embodiment of the present disclosure. The network device may be a FlexE device, and may have a FlexE interface of N*25 G, N*50 G, N*100 G, or the like. The network device includes: an obtaining module 901, a mapping module 902, and a sending module 903.

The obtaining module 901 is configured to obtain a radio fronthaul interface signal, where the radio fronthaul interface signal includes a plurality of code blocks.

The mapping module 902 is configured to map the radio fronthaul interface signal to M flexible Ethernet FlexE service layer timeslots to generate a FlexE signal, where the FlexE service layer timeslots are determined based on a rate of the radio fronthaul interface signal, and M is a positive integer greater than or equal to 1.

The sending module 903 is configured to send the FlexE signal to one or more physical lanes.

The network device may implement the technical solutions in the embodiments shown in FIG. 3a and FIG. 3b. For example, the radio fronthaul interface signal may include a CPRI signal, an eCPRI signal, an NGFI signal, or the like.

The radio fronthaul interface signal is a CPRI signal in descriptions. The CPRI signal may include any one or more of CPRI signals of CPRI.1 to CPRI.7 whose encoding format is 8B/10B encoding, or may include any one or more of CPRI signals of CPRI.8 to CPRI.10 whose encoding format is 64B/66B encoding. Before the CPRI signal is mapped to a FlexE service layer timeslot, a plurality of 64B/66B code blocks of the CPRI signal may be obtained. Optionally, when a CPRI signal using an 8B/10B encoding format is obtained, encoding format conversion may be performed on the CPRI signal using the 8B/10B encoding format to convert the CPRI signal to 64B/66B encoding.

Optionally, the FlexE service layer timeslots may be divided based on a rate of the CPRI signal. For example, a bandwidth of the FlexE service layer timeslot may be slightly greater than a lowest rate of the CPRI signal, that is, the rate of CPRI.1. Because the FlexE service layer timeslots are flexibly divided, the CPRI signal may be mapped to an integer quantity of FlexE service layer timeslots. For example, a value of M includes any one of 1, 2, 4, 5, 8, 10, 16, 20, 24, and 48. The FlexE service layer timeslots may be alternatively divided based on a CPRI signal having another rate level or a rate of another type of radio fronthaul interface signal, to improve FlexE carrying efficiency and CPRI signal transmission efficiency.

Figure 10:
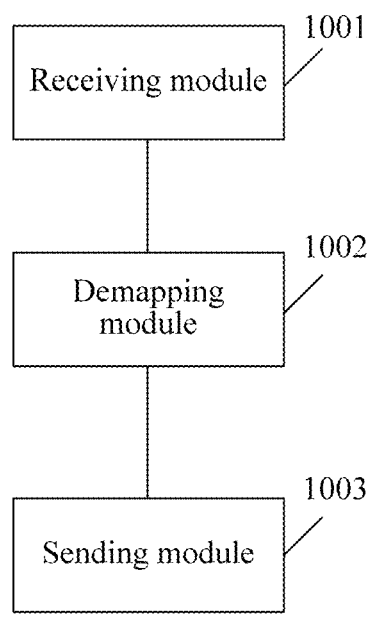
FIG. 10 is a schematic structural diagram of a network device according to an embodiment of the present disclosure.

FIG. 10 is a schematic structural diagram of a network device according to an embodiment of the present disclosure. The network device may be a FlexE device, and may have a FlexE interface of N*25 G, N*50 G, N*100 G, or the like. The network device includes: a receiving module 1001, a demapping module 1002, and a sending module 1003.

The receiving module 1001 is configured to receive a flexible Ethernet FlexE signal through one or more physical lanes.

The demapping module 1002 is configured to demap a radio fronthaul interface signal from M FlexE service layer timeslots of the FlexE signal, where the FlexE service layer timeslots are determined based on a rate of the radio fronthaul interface signal, and M is a positive integer greater than or equal to 1.

The sending module 1003 is configured to send the radio fronthaul interface signal, where the radio fronthaul interface signal includes a plurality of code blocks.

The network device may implement the technical solutions in the embodiments shown in FIG. 3a and FIG. 3b. For example, the radio fronthaul interface signal may include a CPRI signal, an eCPRI signal, an NGFI signal, or the like.

The radio fronthaul interface signal is a CPRI signal in descriptions. The CPRI signal may include any one or more of CPRI signals of CPRI.1 to CPRI.7 whose encoding format is 8B/10B encoding, or may include any one or more of CPRI signals of CPRI.8 to CPRI.10 whose encoding format is 64B/66B encoding. Optionally, if a network device on a sending side converts any one or more signals of CPRI.1 to CPRI.7 from 8B/10B encoding to 64B/66B encoding, for signals of CPRI.1 to CPRI.7 or the like, the CPRI signals may be converted from 64B/66B encoding to 8B/10B encoding.

Optionally, the FlexE service layer timeslots may be divided based on a rate of the CPRI signal. For example, a bandwidth of the FlexE service layer timeslot may be slightly greater than a lowest rate of the CPRI signal, that is, the rate of CPRI.1. Because the FlexE service layer timeslots are flexibly divided, the CPRI signal may be mapped to an integer quantity of FlexE service layer timeslots. For example, a value of M includes any one of 1, 2, 4, 5, 8, 10, 16, 20, 24, and 48. The FlexE service layer timeslots may be alternatively divided based on a CPRI signal having another rate level or a rate of another type of radio fronthaul interface signal, to improve FlexE carrying efficiency and CPRI signal transmission efficiency.

Figure 11:
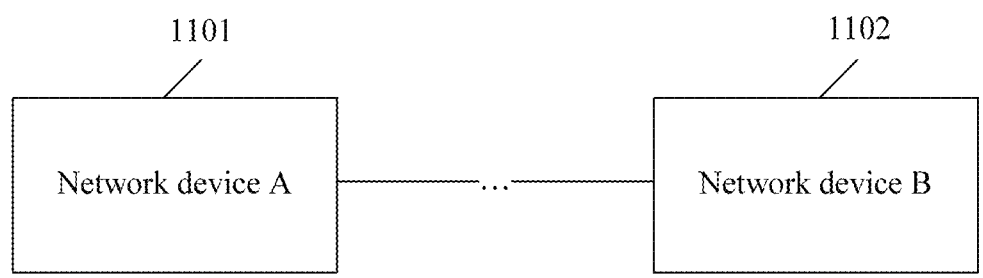
FIG. 11 is a schematic structural diagram of a network system according to an embodiment of the present disclosure.

FIG. 11 is a schematic structural diagram of a network system according to an embodiment of the present disclosure. The network system may include at least two network devices, for example, a network device 1101 and a network device 1102. Another network device may be further included between the network device 1101 and the network device 1102. The network device 1101 and the network device 1102 may be FlexE devices. Both the network devices 1101 and 1102 may perform a sending function and a receiving function. For example, both the network devices 1101 and 1102 may implement the technical solutions in the embodiments shown in FIG. 3a and FIG. 3b. The network devices 1101 and 1102 may alternatively perform only one of a sending function and a receiving function. For example, when the network device 1101 is a network device at a transmit end, the network device 1101 may implement the technical solution in the embodiment shown in FIG. 9. When the network device 1102 is a network device at a receive end, the network device 1102 may implement the technical solution in the embodiment shown in FIG. 10.

Figure 12:
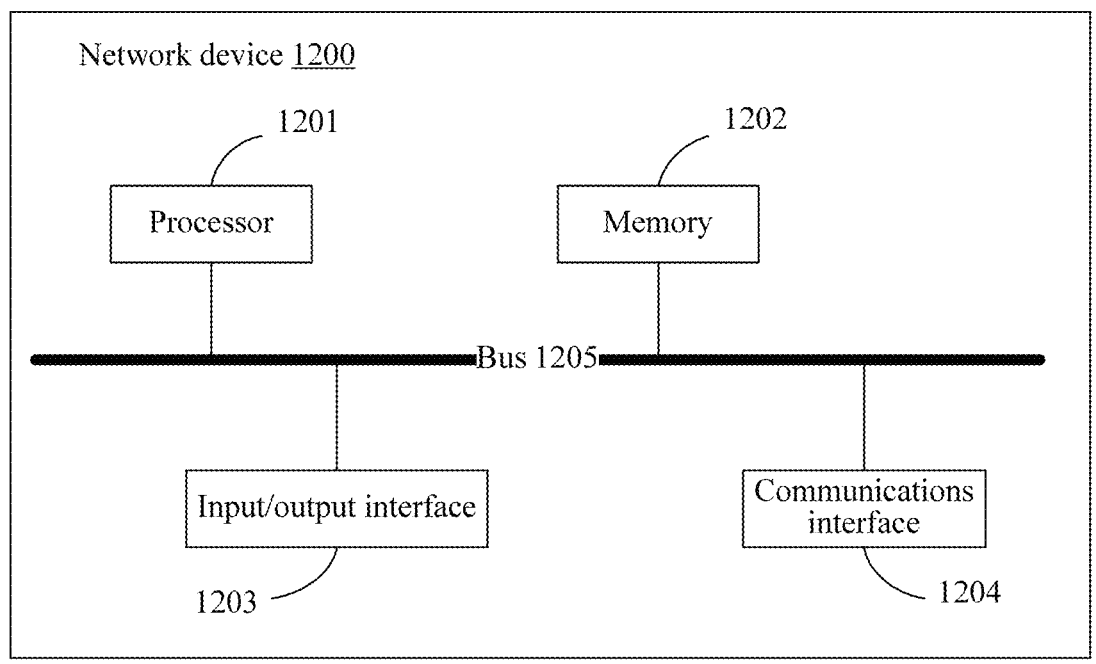
FIG. 12 is a schematic structural diagram of a network device according to an embodiment of the present disclosure.

FIG. 12 is a schematic structural diagram of a network device according to an embodiment of the present disclosure. As shown in FIG. 12, the network device 1200 includes: a processor 1201, a memory 1202, an input/output interface 1203, a communications interface 1204, and a bus 1205. The processor 1201, the memory 1202, the input/output interface 1203, and the communications interface 1204 implement communication connection with each other by using the bus 1205.

A general-purpose central processing unit (CPU), a microprocessor, an application-specific integrated circuit (ASIC), or at least one integrated circuit may be used as the processor 1201. The processor 1201 is configured to execute a related program to implement the technical solutions provided in the embodiments of the present disclosure.

The memory 1202 may be a read-only memory (ROM), a static storage device, a dynamic storage device, or a random access memory (RAM). The memory 1202 may store an operating system and another application. When the technical solutions provided in the embodiments of the present disclosure are implemented by using software or firmware, program code used to implement the technical solutions provided in the embodiments of the present disclosure is stored in the memory 1202 and is executed by the processor 1201.

The input/output interface 1203 is configured to receive input data and information, and output data such as an operation result.

The communications interface 1204 uses, for example, but is not limited to, a transceiver apparatus such as a transceiver, to implement communication between the network device 1200 and another device or a communications network.

The bus 1205 may include a path, and transfers information between the components (for example, the processor 1201, the memory 1202, the input/output interface 1203, and the communications interface 1204) of the network device 1200.

The network device 1200 obtains a radio fronthaul interface signal by using the communications interface 1204, where the radio fronthaul interface signal includes a plurality of code blocks; executes, by using the processor 1201, the code stored in the memory 1202; maps the radio fronthaul interface signal to M flexible Ethernet FlexE service layer timeslots, to generate a FlexE signal, where the FlexE service layer timeslots are determined based on a rate of the radio fronthaul interface signal, and M is a positive integer greater than or equal to 1; and sends the FlexE signal to one or more physical lanes by using the communications interface 1204.

The network device 1200 receives the flexible Ethernet FlexE signal through one or more physical lanes on the communications interface 1204; executes, by using the processor 1201, the code stored in the memory 1202, demaps the radio fronthaul interface signal from the M FlexE service layer timeslots of the FlexE signal, where the FlexE service layer timeslots are determined based on the rate of the radio fronthaul interface signal, and M is a positive integer greater than or equal to 1; and sends the radio fronthaul interface signal by using the communications interface 1204, where the radio fronthaul interface signal includes a plurality of code blocks.

Specifically, the network device 1200 shown in FIG. 12 can implement the functions of the network devices shown in FIG. 9 and FIG. 10. It should be noted that although the network device 1200 shown in FIG. 12 shows only the processor 1201, the memory 1202, the input/output interface 1203, the communications interface 1204, and the bus 1205, in a specific implementation process, a person skilled in the art should understand that the network device 1200 further includes another component used by a normal operation. In addition, based on a specific requirement, a person skilled in the art should understand that the network device 1200 may further include a hardware device for implementing another additional function. In addition, a person skilled in the art should understand that the network device 1200 may alternatively include only devices used to implement the embodiments of the present disclosure, and does not need to include all devices shown in FIG. 12.

In this embodiment of the present disclosure, the radio fronthaul interface signal such as a CPRI signal, an eCPRI signal, or an NGFI signal is carried by using FlexE, and the FlexE service layer timeslots are divided based on the rate of the radio fronthaul interface signal. Therefore, bandwidth usage of a fronthaul FlexE interface and transmission efficiency of the radio fronthaul interface signal are improved.

A person of ordinary skill in the art shall understand that the aspects or possible implementations of the aspects of the present disclosure may be specifically implemented as a system, a method, or a computer program product. Therefore, each aspect of the present disclosure or a possible implementation of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present disclosure or the possible implementation of each aspect may take a form of a computer program product, where the computer program product refers to computer-readable program code stored in a computer-readable medium.

The foregoing are merely example embodiments of the present disclosure. A person skilled in the art may make various modifications and variations to the present disclosure without departing from the spirit and scope of the present disclosure.

What is claimed is:

1. A method for sending a radio fronthaul interface signal, the method comprising:
   obtaining, by a network device, a radio fronthaul interface signal, wherein the radio fronthaul interface signal comprises a plurality of code blocks, and includes different rate levels;
   mapping the radio fronthaul interface signal to M flexible Ethernet (FlexE) service layer timeslots to generate a FlexE signal, wherein a bandwidth of the M FlexE service layer timeslots is determined based on a lowest rate level of the plurality of rate levels of the radio fronthaul interface signal, and M is a positive integer greater than or equal to 1, where the fronthaul interface signal at each rate level is mapped to one more of the M FlexE service layer timeslots that correspond to a physical sub-calendar of a master calendar;
   inserting a FlexE overhead to a data flow of each physical sub-calendar, the FlexE overhead identifying a correspondence between the fronthaul interface signal at a particular rate level and the one or more FlexE service layer timeslots corresponding to the physical sub-calendar; and
   sending the FlexE signal to the one or more physical sub-calendars.

2. The method of claim 1, wherein the bandwidth of the M FlexE service layer timeslots is greater than or equal to the lowest rate level of the radio fronthaul interface signal.

3. The method of claim 1, wherein at least one code block of the plurality of code blocks is a 64B/66B code block.

4. The method of claim 3, wherein obtaining a radio fronthaul interface signal comprises:
obtaining the radio fronthaul interface signal using an 8B/10B encoding format; and
performing encoding format conversion on the radio fronthaul interface signal using the 8B/10B encoding format, wherein the radio fronthaul interface signal on which the encoding format conversion is performed comprises a plurality of 64B/66B code blocks.

5. The method of claim 1, wherein a value of M comprises any one of integers 1, 2, 4, 5, 8, 10, 16, 20, 24, and 48.

6. The method of claim 1, wherein a bandwidth of each of the one or more physical sub-calendars is 25 G or 50 G.

7. The method of claim 1, further comprising:
performing rate adaptation on the radio fronthaul interface signal, so that the rate of the radio fronthaul interface signal is adapted to a rate of the FlexE service layer timeslots.

8. The method of claim 1, wherein the bandwidth of the M FlexE service layer timeslots is greater than or equal to the lowest rate level of the radio fronthaul interface signal.

9. The method of claim 1, wherein a bandwidth of each of the one or more physical sub-calendars is 25 G or 50 G.

10. The method of claim 3, wherein obtaining a radio fronthaul interface signal comprises:
obtaining the radio fronthaul interface signal using an 8B/10B encoding format; and
performing encoding format conversion on the radio fronthaul interface signal using the 8B/10B encoding format, wherein the radio fronthaul interface signal on which the encoding format conversion is performed comprises a plurality of 64B/66B code blocks.

11. The method of claim 1, wherein a value of M comprises any one of integers 1, 2, 4, 5, 8, 10, 16, 20, 24, and 48.

12. The method of claim 1, wherein a bandwidth of the physical lane is 25 G or 50 G.

13. The method of claim 1, further comprising:
performing rate adaptation on the radio fronthaul interface signal, so that the rate of the radio fronthaul interface signal is adapted to a rate of the FlexE service layer timeslots.

14. A method for receiving a public radio interface radio fronthaul interface signal, the method comprising:
receiving, by a network device, a flexible Ethernet (FlexE) signal through one or more physical sub-calendars of a master calendar, each physical sub-calendar representing a physical lane, each physical sub-calendar including a FlexE overhead added to a data flow of the physical sub-calendar, the FlexE overhead identifying a correspondence between a fronthaul interface signal at a particular rate level of a plurality of rate levels in the fronthaul interface signal and one or more FlexE service layer timeslots corresponding to the physical sub-calendar;
demapping, based on the overhead in each physical sub-calendar, the radio fronthaul interface signal from M FlexE service layer timeslots of the FlexE signal, wherein a bandwidth of the M FlexE service layer timeslots are determined based on a lowest rate level of the plurality of rate levels in the radio fronthaul interface signal, and M is a positive integer greater than or equal to 1; and
sending the radio fronthaul interface signal, wherein the radio fronthaul interface signal comprises a plurality of code blocks.

15. The method of claim 14, wherein the bandwidth of the M FlexE service layer timeslot is greater than or equal to the lowest rate of the radio fronthaul interface signal.

16. The method of claim 14, wherein at least one code block of the plurality of code blocks is a 64B/66B code block.

17. The method of claim 16, wherein sending the radio fronthaul interface signal comprises:
performing encoding format conversion on the radio fronthaul interface signal using a 64B/66B encoding format; and
sending the radio fronthaul interface signal on which encoding format conversion is performed, wherein the radio fronthaul interface signal on which the encoding format conversion is performed comprises a plurality of 8B/10B code blocks.

18. The method of claim 14, wherein a value of M comprises any one of integers 1, 2, 4, 5, 8, 10, 16, 20, 24, and 48.

19. The method of claim 14, wherein a bandwidth of each of the one or more physical sub-calendars is 25 G or 50 G.

20. A network system, wherein the network system comprises a first network device and a second network device, wherein
the first network device configured to:
obtain a radio fronthaul interface signal, wherein the radio fronthaul interface signal comprises a plurality of code blocks, and includes different rate levels;
map the radio fronthaul interface signal to M flexible Ethernet (FlexE) service layer timeslots to generate a FlexE signal, wherein a bandwidth of the M FlexE service layer timeslots is determined based on a lowest rate level of the plurality of rate levels of the radio fronthaul interface signal, and M is a positive integer greater than or equal to 1, where the fronthaul interface signal at each rate level is mapped to one or more of the M FlexE service layer timeslots that correspond to a physical sub-calendar of a master calendar;
insert a FlexE overhead to a data flow of each physical sub-calendar, the FlexE overhead identifying a correspondence between the fronthaul interface signal at a particular rate level and the one or more FlexE service layer timeslots corresponding to the physical sub-calendar; and
send the FlexE signal to one or more physical sub-calendars; and
the second network device configured to receive the FlexE signal from the first network device.

* * * * *

UNITED STATES PATENT AND TRADEMARK OFFICE
CERTIFICATE OF CORRECTION

PATENT NO. : 11,032,024 B2
APPLICATION NO. : 16/453795
DATED : June 8, 2021
INVENTOR(S) : Qiuyou Wu, Wei Su and Qiwen Zhong Page 1 of 1

It is certified that error appears in the above-identified patent and that said Letters Patent is hereby corrected as shown below:

In the Claims

Claim 1, Column 16, Line 57, "to one more of the" should read --to one or more of the--.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*